United States Patent [19]

Scherzer et al.

[11] Patent Number: 5,698,603
[45] Date of Patent: Dec. 16, 1997

[54] EXPANDABLE STYRENE POLYMERS CONTAINING RECYCLED MATERIAL

[75] Inventors: Dietrich Scherzer, Neustadt; Klaus Hahn, Kirchheim; Michael Witt; Maria Lorenz, both of Ludwigshafen, all of Germany

[73] Assignee: BASF Aktiengesellschaft, Ludwigshafen, Germany

[21] Appl. No.: 793,457

[22] PCT Filed: Aug. 17, 1995

[86] PCT No.: PCT/EP95/03283

§ 371 Date: Feb. 27, 1997

§ 102(e) Date: Feb. 27, 1997

[87] PCT Pub. No.: WO96/07694

PCT Pub. Date: Mar. 14, 1996

[30] Foreign Application Priority Data

Sep. 2, 1994 [DE] Germany .................. 44 31 211.3

[51] Int. Cl.$^6$ .................. C08G 9/20; B01D 35/18
[52] U.S. Cl. .................. 521/56; 210/767; 210/773; 521/47; 521/59; 521/60; 521/94; 521/146; 521/129
[58] Field of Search .................. 521/56, 47, 59, 521/60, 94, 129, 146; 210/767, 773

[56] References Cited

U.S. PATENT DOCUMENTS

| | | | |
|---|---|---|---|
| 3,755,209 | 8/1973 | Nintz et al. | 521/56 |
| 5,269,948 | 12/1993 | Krutchen | 210/774 |

*Primary Examiner*—Morton Foelak
*Attorney, Agent, or Firm*—Keil & Weinkauf

[57] ABSTRACT

The present invention relates to expandable styrene polymers containing recycled polystyrene, having a recycled material content of from 10 to 50% by weight, based on the total weight of the polystyrene, to which alkyldi(2-hydroxyethyl)amines have been added during the polymerization.

4 Claims, No Drawings

EXPANDABLE STYRENE POLYMERS CONTAINING RECYCLED MATERIAL

The present invention relates to expandable styrene polymers containing recycled material which can be converted into foams having an improved foam structure.

Plastics based on styrene and styrene-containing copolymers are produced in large amounts and are used in many areas of industry. Considerable importance is also attached to foamed products.

The production and use of these products have been known for some time and have been described in a variety of publications.

A problem which has become particularly important in recent times is the recycling of used plastics.

In the case of polystyrene foams, various recycling methods are known.

One possibility comprises using polystyrene foam or unfoamed polystyrene waste for the extrusion of polystyrene foams.

This recycled material can be used either alone or as a mixture with fresh polystyrene.

The production of foams from the recycled materials can be carried out directly here, as usual, by steam-treatment of the polymer in the extruder with subsequent foaming to give boards or by extrusion to give minigranules, which can be impregnated with blowing agent and foamed.

It is also possible to dissolve the used polystyrene in monomeric styrene and to re-polymerize this solution by known methods, for example as described in U.S. Pat. No. 5,269,948 and JP-A-5,660,096.

A particular disadvantage in the polymerization of solutions of recycled polystyrene in monomeric styrene is that the foam structure of the foams produced using these styrene polymers is unsatisfactory. In particular when recycled polystyrene grades containing flameproofing agents are used, the resultant polystyrene foams have small cells, which is undesired.

It is an object of the present invention to provide polystyrene containing recycled material which has a uniform foam structure without the undesired fine-cell content and has good mechanical properties and is simple to prepare.

We have found that, surprisingly, this object is achieved by adding alkyldi(2-hydroxyethyl)amines to the solution of recycled polystyrene in vinylaromatic monomers, in particular styrene, during the polymerization.

The present invention accordingly provides expandable styrene polymers containing recycled polystyrene to which alkyldi(2-hydroxyethyl)amines have been added during the polymerization.

The content of recycled polystyrene in the novel products is from 10 to 50% by weight, based on the total weight of the polystyrene.

The alkyldi(2-hydroxyethyl)amines are added to the polystyrene containing recycled material in an amount of from 50 to 1000 ppm, preferably from 50 to 500 ppm, based on the total mixture of recycled material and monomer.

The alkyldi(2-hydroxyethyl)amines are preferably not added until after stabilization of the bead size, i.e. after addition of the suspension stabilizer.

The fact that it was possible to achieve the object of the invention by adding alkyldi(2-hydroxyethyl)amines was unforeseeable to the person skilled in the art.

Although the use of amines in the production of polystyrene foams has been disclosed, for example in DE-A-25 20 635, these products are usually used in the production of flameproofed polystyrene particle foams or as coating agents for improving the antistatic properties.

The prior art did not reveal that the use of such compounds in polystyrene foams containing recycled material would result in a uniform foam structure.

The alkyldi(2-hydroxyethyl)amine used is, in particular, a $C_{12}$–$C_{14}$-alkyldi(2-hydroxyethyl)amine. This product is commercially available, for example, as Armostat® 400 from Akzo.

In a particularly advantageous embodiment, the alkyldi (2-hydroxyethyl)amines are used together with a polyethylene wax. The latter is preferably employed in an amount of from 500 to 1000 ppm.

The polyethylene waxes used here generally have a mean molecular weight (number average) of from 2000 to 6000, preferably from 2000 to 4000, particularly preferably from 2500 to 3500. A particularly suitable polyethylene wax is BASF Luwax® having a mean molecular weight (number average) of 3000. The polyethylene waxes preferably have a mean particle size of from 5 to 50 µm. Overlarge particles cause problems with distribution in the polymer, while excessively fine products can cause problems with dust.

The vinyl group-containing monomer employed is, in particular, styrene. However, it is also possible to employ mixtures of styrene with other monomers containing vinyl groups.

These mixtures advantageously have a styrene content of at least 50% by weight. The other monomers containing vinyl groups can be, for example, acrylonitrile, methylstyrene, ring-halogenated or ring-alkylated styrenes, esters of acrylic acid or methacrylic acid with alcohols having up to 8 carbon atoms, N-vinyl compounds, such as vinylcarbazole, or alternatively small amounts of compounds containing two polymerizable double bonds, such as butadiene, divinylbenzene and butadiene diacrylate.

The styrene polymers can also contain conventional amounts of other substances which give the expandable products certain properties. Examples which may be mentioned are flameproofing agents based on organic bromine or chlorine compounds, such as trisdibromopropyl phosphate, hexabromocyclododecane, chlorinated paraffin, and synergists for flameproofing agents, such as dicumyl peroxide and highly unstable organic peroxides; furthermore antistatics, stabilizers, dyes, lubricants, fillers and substances which have a non-stick action during foaming, such as zinc stearate, melamine-formaldehyde condensates or silicic acid, and agents for shortening the demolding time during expansion, such as glycerol esters or hydroxycarboxylic esters. Depending on the intended action, the additives can be homogeneously distributed in the particles or in the form of a surface coating.

In order to prepare the novel expandable styrene polymers containing recycled material, the dry and, if necessary, precompacted recycled polystyrene is first dissolved in the monomers containing vinyl groups, preferably at room temperature.

In order to remove mechanical impurities which are insoluble in the monomers containing vinyl groups, the solution is advantageously filtered before the polymerization.

The polymerization is carried out by the suspension method. To this end, the solution of the recycled polystyrene in the monomers is transferred into the reactor containing the aqueous phase, where the polymerization is carried out.

The suspension polymerization is generally carried out in the presence of suspension stabilizers and conventional styrene-soluble polymerization catalysts.

The blowing agent is generally added during the polymerization, but it is also possible to introduce the blowing agent into the styrene polymer in a subsequent step.

For the production of foams, the expandable styrene polymer beads are expanded in a known manner by heating to above their softening point, for example by means of hot air or preferably by means of steam. The foam beads obtained can, after cooling and, if desired, after interim storage, be re-expanded by further heating. Finally, they can be welded in a known manner in non-gas-tight molds to give moldings.

Further details on conventional impregnation, extrusion and foaming processes are given, for example, in Kunststoffhandbuch, Volume 5, Polystyrene, edited by R. Vieweg and G. Daumiller, Carl-Hanser-Verlag, Munich, 1969.

The novel polystyrene foams are distinguished from other polystyrene foams containing recycled material by a uniform foam structure. Even a small amount of contamination by other polymers and additives in the recycled material, which cannot be removed from the latter by conventional purification methods, do not have any disadvantageous effects on the foam structure of novel products.

This allows even foamed and unfoamed polystyrene waste produced outside the actual production process, which have different material characteristics and in some cases also different additives, to be re-converted into high-quality foams by a very simple process. In particular, it is also possible to convert flameproofed polystyrene waste back into polystyrene particle foams.

The invention is described in greater detail with reference to the examples below.

EXAMPLES 1–9

A mixture of 19.5 kg of demineralized water, 19.5 g of $Na_4P_2O_7$ and 52.7 g of $MgSO_4$ was introduced into a pressure-tight 50 l stirred reactor made of stainless steel. 17 kg of a styrene solution of the amount of recycled polystyrene given in the table, 17 g of dibenzoyl peroxide and 51 g of dicumyl peroxide were added. The mixture was heated from 25° to 100° C. over the course of 2 hours and then from 100° to 130° C. over the course of 5 hours. The mixture was kept at 130° C. for a further 3 hours.

478 g of a 10% strength aqueous polyvinylpyrrolidone solution (K value 90) were added to the mixture 55 minutes after it had reached 80° C., the amounts given in the table of $C_{12}$–$C_{14}$-alkyldi(2-hydroxyethyl)amine (Armostat® 400 from Akzo) and polyethylene wax (Luwax® from BASF) were added after a further 30 minutes, and 1.3 kg, corresponding to 7.7% by weight, based on the styrene polymer, of n-pentane were added after a further 95 minutes.

The resultant beads were centrifuged off, dried with cold air in countercurrent and coated with 0.1% by weight, based on the weight of the uncoated beads, of ethylenebisstearamide.

The bead size fraction from 0.70 to 1.0 mm was then screened out and coated with 0.5% by weight, based on the styrene polymers containing blowing agent, of a mixture of 40% by weight of trisstearyl citrate, 50% by weight of glycerol monostearate and 10% by weight of silicic acid FK 320 (Goldschmidt).

The mixture was prefoamed for 6 minutes in an unpressurized foaming box (Rauscher), and the foam structure of the resultant beads was determined.

The precise mixing ratios of the starting materials and the properties of the foams are shown in Table 1. The recycled polystyrene had a viscosity number of 60 g/ml, a toluene-insoluble residue of 0.2% by weight and an ashing residue of 0.05% by weight, in each case based on the weight of the recycled material.

TABLE

| Example | Amount of recycled material (% by wt.)[1] | Suspension stabilizer | Amine* content (ppm) | Polyethylene wax content (ppm) | Cell count (Cells/mm) | Foam structure |
|---|---|---|---|---|---|---|
| 1 (Comparison) | — | MPP | — | — | 5 | gross, inhomogeneous |
| 2 (Comparison) | — | MPP | — | 1000 | 8 | medium, inhomogeneous |
| 3 (Comparison) | 20 | MPP | — | — | 20 | fine, very inhomogeneous |
| 4 (Comparison) | 20 | MPP | — | 1000 | 18 | fine, very inhomogeneous |
| 5 | 20 | MPP | 200 | — | 10 | medium, inhomogeneous |
| 6 (Comparison) | 20 | MPP | 200 | 1000 | 10 | medium, uniform |
| 7 (Comparison) | — | KSO | — | — | 4 | gross, very inhomogeneous |
| 8 | 20 | KSO | — | 1000 | 17 | fine, inhomogeneous |
| 9 | 20 | KSO | 200 | — | 9 | medium, uniform |

MPP — Magnesium pyrophosphate
KSO — Polyvinylpyrrolidone solution (K value 90)
Amine* - $C_{12}$–$C_{14}$-Alklydi(2-hydroxyethyl)amine (Armostat ® 400, AKZO)
Polyethylene wax - Luwax ® AF31 (BASF)
[1]based on the total amount of monomers and recycled material
The cell count and the cell structure were determined visually.

We claim:

1. A process for the preparation of an expandable styrene polymer which contains from 10 to 50% by weight, based on the total weight of the styrene polymer, of recycled polystyrene, in which the recycled polystyrene is dissolved in monomeric styrene and this solution being polymerized in aqueous suspension, wherein alkyldi(2-hydroxyethyl) amines are added to the reaction mixture after addition of the suspension stabilizer.

2. A process as claimed in claim 1, wherein from 50 to 1000 ppm of alkyldi(2-hydroxyethyl)amines have been added to the reaction mixture.

3. A process as claimed in claim 2, wherein additionally from 500 to 1000 ppm of a polyethylene wax have been added to the reaction mixture.

4. An expandable styrene polymer which contains from 10 to 50% by weight, based on the total weight of the styrene polymer, of recycled polystyrene and which contains an alkyldi(2-hydroxyethyl)amine and a polyethylene wax.

* * * * *